Sept. 6, 1927.
C. I. HALL
1,641,673
MEANS FOR MEASURING THE VISCOSITY OF FLUIDS
Filed Dec. 9, 1925
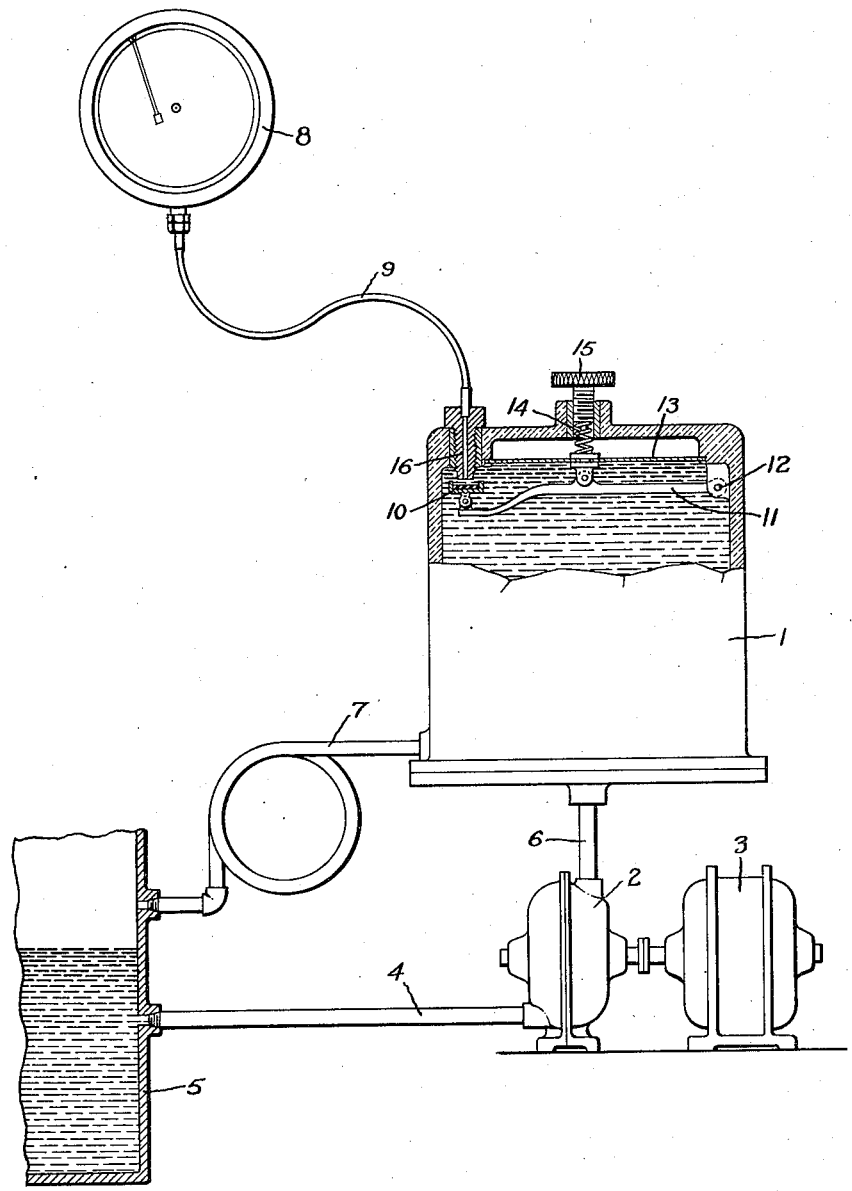
Inventor
Chester I. Hall,
by [signature]
His Attorney.

Patented Sept. 6, 1927.

1,641,673

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

MEANS FOR MEASURING THE VISCOSITY OF FLUIDS.

Application filed December 9, 1925. Serial No. 74,400.

The present invention relates to the measurement of the viscosity of fluids.

The object of my invention is to provide an improved means for measuring the viscosity of a fluid, and for a consideration of what I believe to be novel and my invention, attention is directed to the accompanying description and the claim appended thereto.

In the drawing, the figure is a diagrammatic view of apparatus embodying my invention and one through the use of which my improved method may be carried out.

Referring to the drawing, 1 indicates a pressure chamber of suitable size and which may be formed from any suitable material. In the present instance, I have indicated it as being constructed of glass. Arranged adjacent to pressure chamber 1 is a positive displacement pump 2, such as a gear pump. The essential thing is that pump 2 be of a type which, when operated at a definite speed, delivers a definite volume of fluid. Pump 2 may be driven by any suitable means. In the present instance, it is shown as being driven by an electric motor 3 which may be operated at constant speed. The suction side of pump 2 is connected by a conduit 4 to the supply of fluid, the viscosity of which is to be measured. In the present instance, the fluid is indicated as being contained in a tank 5. The discharge side of pump 2 is connected by a conduit 6 to pressure chamber 1. Connected to pressure chamber 1 is a calibrated conduit or tube 7 of suitable length and diameter. Its discharge end may lead to any suitable point. In the present instance, it is shown as conveying the fluid from pressure chamber 1 back to tank 5. Connected to pressure chamber 1 is a suitable gauge 8 for indicating or indicating and recording the pressure in chamber 1. It is shown as being connected to chamber 1 by a pipe 9.

In most applications, it is desirable to limit the pressure to be built up by pump 2 to a comparatively small value and this means that a comparatively sensitive recorder must be used. To prevent excessive pressure, in case it should occur, from injuring the recorder, an automatically-operated valve means is provided for disconnecting the recorder from the pressure chamber whenever the pressure exceeds a predetermined high value. For this purpose, I have shown in the present instance a valve member 10 carried by an arm 11 pivoted to the inner wall of chamber 1, as is indicated at 12. Arm 11 is pivotally connected to a flexible diaphragm 13 located inside chamber 1 at its upper end. Bearing on the upper side of diaphragm 13 is a spring 14, the tension of which may be adjusted by means of a thumb screw 15. Valve member 10 is adapted to seat against the lower end of a nozzle 16 through which pipe 9 communicates with the interior of chamber 1. When the pressure in chamber 1 exceeds a predetermined value, diaphragm 13 will be forced upward, thereby raising arm 11 and bringing valve member 10 against the inner end of nozzle 16, thus shutting off communication between the interior of chamber 1 and the instrument 8.

In operation motor 3 is driven at a definite constant speed. As a result, pump 2 delivers a constant volume of fluid from the tank 5 to pressure chamber 1. This fluid flows out of pressure chamber 1 through the calibrated conduit or tube 7. The rate at which the fluid flows through tube 7 depends upon the pressure in chamber 1, the rate of flow increasing with the pressure. Also, the rate of flow of the fluid through tube 7 is a function of its viscosity. As a result, therefore, the pressure in chamber 1 becomes a measure of the viscosity of the fluid since a pressure will be established in the chamber by pump 2 of a value sufficient to cause the constant volume delivered by the pump to the chamber 1 to flow out through tube 7. Instrument 8 may be calibrated to read directly in terms of viscosity or it may be calibrated in terms which can be converted into terms of viscosity.

It is, of course, known that the viscosity of a fluid varies with its temperature. If my improved instrument is being used under conditions wherein the temperature varies, therefore, it may be desirable to correct for temperature. Under these circumstances, a suitable temperature indicating instrument may be used in connection with the pressure gauge so as to indicate the temperature as well as the pressure.

By my improved apparatus I am enabled to measure and record continuously the viscosity of a fluid, although if desired, measurements may be made at suitable intervals of time.

The same instrument may be used for measuring the viscosity of different fluids, it being necessary only to change the calibrated tube 7, a tube 7 being used in any instances such that with the pressure available in chamber 1, the liquid, the viscosity of which is being measured, will flow through the tube.

What I claim as new and desire to secure by Letters Patent of the United States is:

A viscosity-measuring instrument comprising a pressure chamber, means for continuously supplying to said chamber a constant volume of fluid, a conduit through which the fluid may escape from the chamber, a pressure gauge connected to said chamber, and means for disconnecting it from the chamber when the pressure therein exceeds a predetermined high value.

In witness whereof, I have hereunto set my hand this 5th day of December, 1925.

CHESTER I. HALL.